United States Patent [19]

Logan et al.

[11] 4,367,913
[45] Jan. 11, 1983

[54] INERTIALLY DAMPENED HELIOSTAT ASSEMBLY

[75] Inventors: Dale R. Logan, Bowie; John J. Buckley, Catonsville, both of Md.

[73] Assignee: Westinghouse Electric Corp., Pittsburgh, Pa.

[21] Appl. No.: 268,546

[22] Filed: May 29, 1981

[51] Int. Cl.³ .............................................. G02B 23/00
[52] U.S. Cl. ................................... 350/500; 350/486
[58] Field of Search .......................... 350/16, 26, 486; 250/203 R; 353/3

[56] References Cited

U.S. PATENT DOCUMENTS

| | | | |
|---|---|---|---|
| 3,518,016 | 6/1970 | Burdin et al. | 350/16 X |
| 3,612,643 | 10/1971 | Weber | 250/203 R X |
| 3,761,163 | 9/1973 | Chapman | 250/203 R X |
| 3,951,510 | 4/1976 | Lloyd | 350/16 |
| 3,974,985 | 8/1976 | Campbell et al. | 250/203 R X |
| 4,015,905 | 4/1977 | Lloyd | 350/16 X |

Primary Examiner—John K. Corbin
Assistant Examiner—Matthew W. Koren
Attorney, Agent, or Firm—H. W. Patterson

[57] ABSTRACT

A two axis gimbal set for a pod mounted electro-optical system wherein the azimuth gimbal is supported by the elevation gimbal which in turn is supported between a pair of spaced supporting arms of a base by bearings, one of which has a circular opening therein through which the line-of-sight travels from the optical system to a movable mirror. An inertial dampener is attached to the mirror shaft for reducing effects of vibration on the line-of-sight.

5 Claims, 7 Drawing Figures

INERTIALLY DAMPENED HELIOSTAT ASSEMBLY

BACKGROUND OF THE INVENTION

The present invention relates to heliostat assemblies; and more particularly to such an assembly for electro-optical systems that are preferably adapted to be mounted in pods.

Typical heliostat devices of the type of which the present invention is concerned, are constructed in a manner suitable for use on an aircraft for aiming a remote light source or spot, a concentrated image, or the like along a line of sight via an input mirror, toward a fixed mirror, which in turn directs the same via a lens through a lens barrel, toward a sensor. The input mirror is mounted on a two axis gimbal so that it can be rotated both in elevation and azimuth toward a selected line of sight.

Heretofore, in order to prevent vibration in operation and thereby causing the resulting images to "jitter" or "blur," counterweights were utilized on the elevation gimbal. In an attempt to overcome the adverse affect of the counterweight, the heliostat was revised such that the axis of the stabilizing mirror and the axis of the elevation gimbal were substantially in the same plane, and the mass of the body was distributed fore and aft of the elevation gimbal to eliminate the need for the counterweight. Such prior art devices were satisfactory and performed the function for which they were intended, under the particular requirements and conditions for which they were designed. However, flight conditions and mission requirements have become increasingly more severe such that pod mounted electro-optical systems require continually better line-of-sight stabilization. Under the most extreme of such stringent requirements, these prior art heliostats at times would tend to have a blurred or jittery image caused by vibration of portions of the assembly.

Thus, it is desirable that an improved heliostat assembly be fabricated that minimizes such jittering and blurring even under the most severe requirements.

SUMMARY OF THE INVENTION

In accordance with the present invention, a two axis gimbal set for electro-optical systems is provided, where the elevation gimbal is an annular structure supported by bearings on opposite sides of the movable mirror, and the line-of-sight from the fixed mirror to the movable mirror extends substantially parallel to the elevation axis within the circumference of the bearing surface of the elevation gimbal. Also, such assembly includes an azimuth gimbal that is also an annular structure covered by the elevation gimbal. The azimuth gimbal, which carries the mirror assembly includes an inertial dampener fastened to such assembly.

Specifically, the vibration dampener has a casing fastened to the pulley utilized to rotate the mirror. In such casing there is a metallic mass that is free to rotate against the force centering springs in a dampening fluid, such as silicon, for example.

DESCRIPTION OF THE PREFERRED EMBODIMENT

Figure 1:
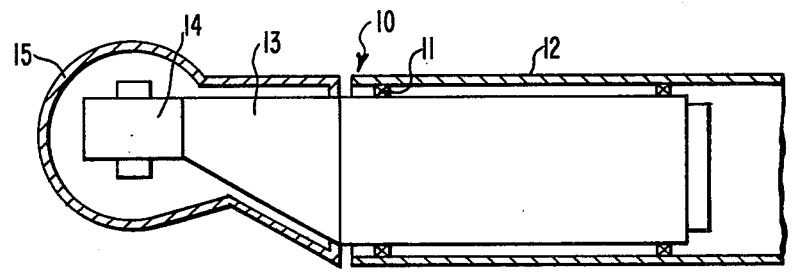
FIG. 1 is a schematic view of a pod in which the heliostat assembly preferably is adapted to be mounted.

Referring to FIG. 1, an electro-optical system in which the present invention is utilized includes a pod 10 that is cylindrical in cross-section and has mounted in the body thereof a pair of axially spaced annular ball bearing assemblies 11 for supporting a sensor mounting structure 12 rotatably in the pod 10. Secured to one end of the mounting structure 12 is an optical assembly housing 13 to which is connected a two axis gimbal assembly 14 constructed in accordance with the present invention.

The forward end of the pod 10 is comprised of a transparent dome 15. The system of FIG. 1 within the pod 10 and the glass dome 15 at the forward end thereof constitutes a three axis gimbal system for accomplishing the beam steering and stabilization. The three axis gimbal system is constructed in a roll traverse arrangement, with limited supplemental azimuth coverage. The roll gimbal is the entire nose portion 15 of the pod; and the two axis gimbal 14 in the nose portion 15 provides the azimuth and elevation degrees of freedom and stabilization for line-of-sight pointing.

Figure 2:
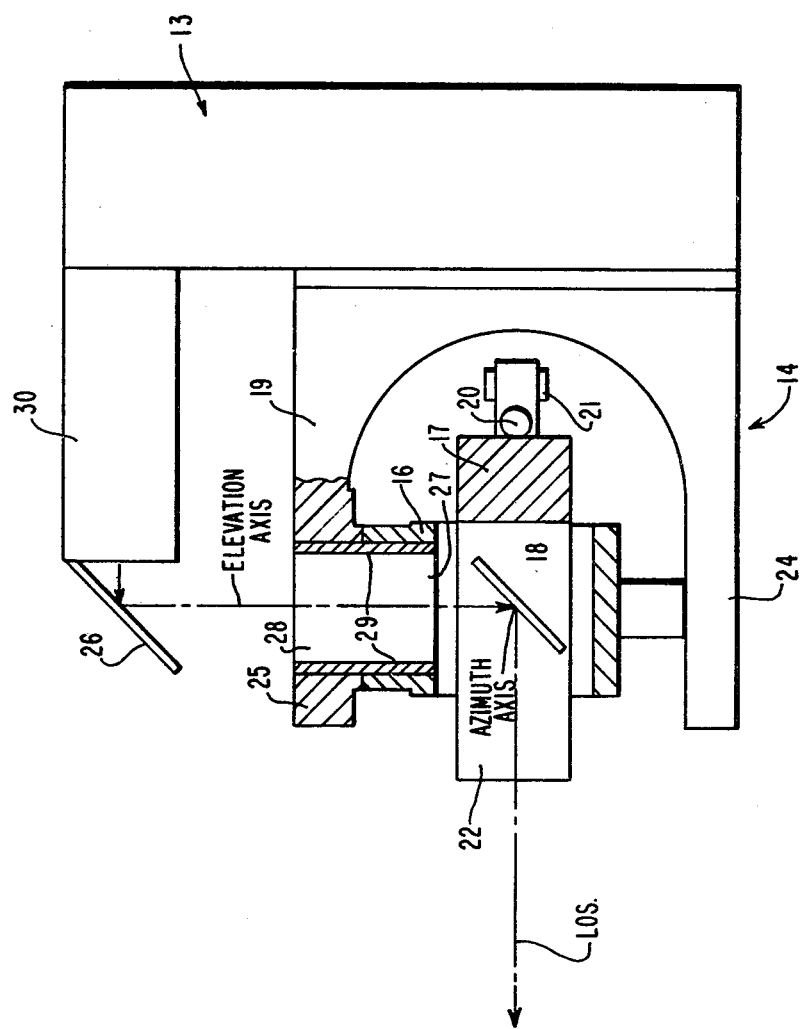
FIG. 2 is a schematic plan view of the assembly of FIG. 3.

Referring to FIG. 2, a schematic sectional plan view is shown of the optical assembly 13 of FIG. 1 to which is attached the heliostat 14 with portions broken away to show elevation gimbal assembly 16 schematically, stabilizing body 17 and base structure 19. The heliostat device 14 is constructed for aiming a light source or image, or the like, along a line-of-sight such as indicated by the arrow marked LOS via a tilted planar input mirror 18 disposed within the stabilized body or in other words the azimuth gimbal 17, which is provided with an elevation gyro 20 and an azimuth gyro 21 that operate when called upon to maintain a forward open end 22 of such stabilized body or azimuth gimbal 17 aimed toward a selected line-of-sight LOS by the inertial action of such gyros operating in a well-known servo loop. The stabilized body 17 is pivotally mounted on the elevation gimbal assembly 16 for relative angular movement along a vertical mirror azimuth axis. The elevation gimbal assembly 16 in turn is mounted between a pair of support arms 24 and 25 of the base 17' for angular elevation movement about a horizontal elevation axis. The input mirror 18 is so arranged relative to the elevation axis that such axis passes centrally through the forward reflecting face of the mirror at an angle of about 45°. Thus, even though relative turning movement of such mirror about the elevation axis between the support arms 24 and 25 should occur as a result of the change in the elevation attitude of the pod 10. The face of the mirror 18 remains substantially in the same plane and undisturbed with respect to aiming a light input toward a fixed mirror 26 through an opening 27 in the elevation gimbal assembly 16 and an opening 28 in the support arm 25. Member 29 represents a ball bearing assembly for the axis in elevation. The casing for the optical assembly 13 includes a lens barrel portion 30 for supporting the fixed mirror 26. For changes in azimuth attitude of the lens barrel 30 of the optical assembly 13, and the base 19, and the elevation gimbal 16, the mirror azimuth axis permits such relative azimuth attitude change to transpire while the stabilized body 17 remains pointed toward the line-of-sight (LOS). The input mirror 18 is arranged to move in azimuth about its mirror azimuth axis one-half as much as the relative angular azimuth movement between the stabilized body 17 and the elevation gimbal 16. By virtue of this latter arrangement, the input light information reaching the input mirror 18 is automatically directed toward the fixed mirror 26 in the presence of azimuth attitude changes in the elevation gimbal 16. The stabilized body or azimuth gimbal 17 as well as the elevation gimbal 16 are configured to be annular, or in other words form a closed ring to resist deformation when subjected to vibration.

Figure 3:
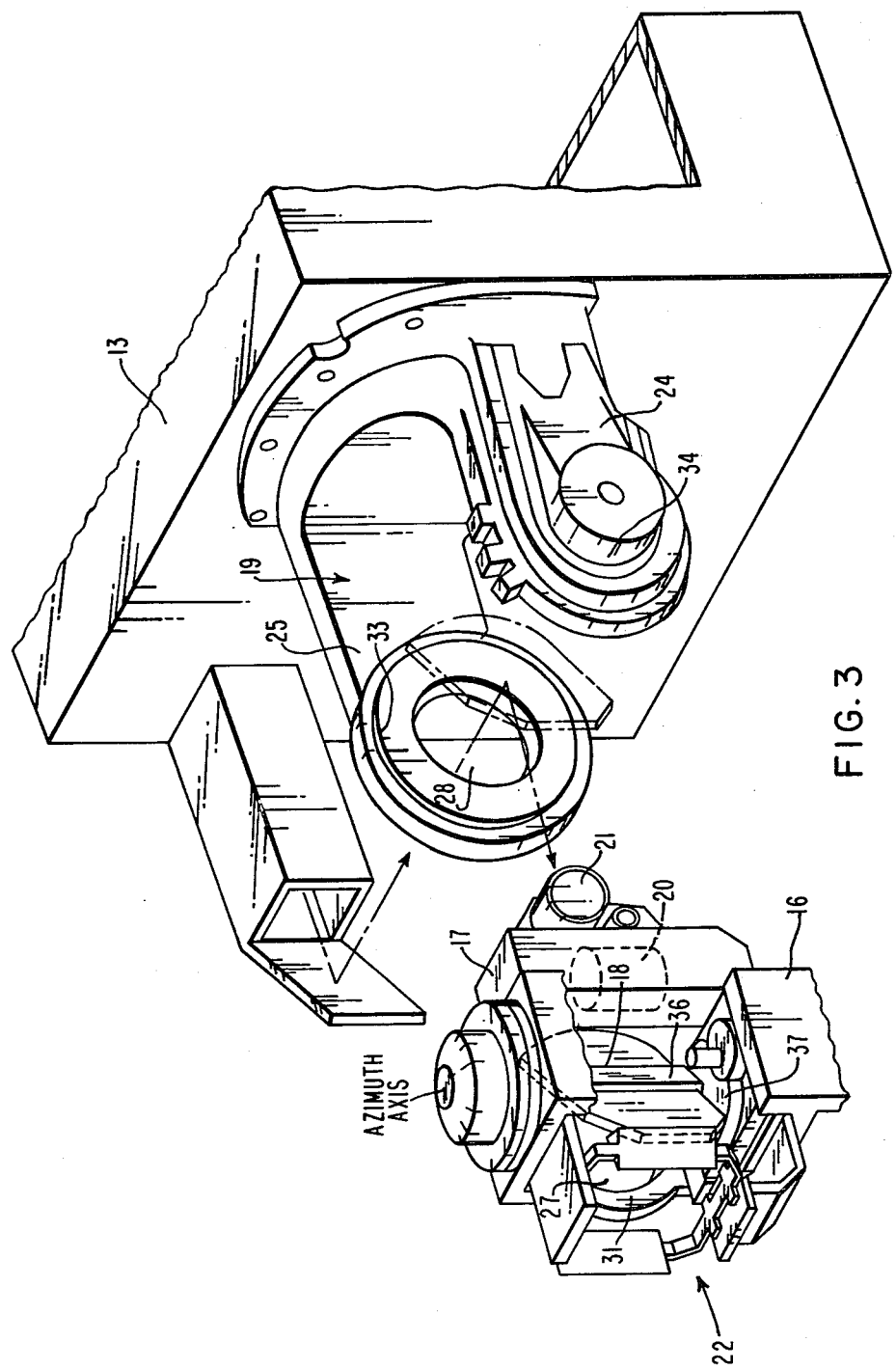
FIG. 3 is a view in perspective that is partially exploded and partially cut away to illustrate the heliostat assembly of the present invention according to one embodiment thereof.

As shown in more detail in FIG. 3, according to one actual reduction to practice the azimuth gimbal 17 and the elevation gimbal 16 are annular closed structures in contrast to the prior art U or C shaped structures. Such closed structures are substantially rectangular annular members. Such a configuration minimizes the effects of vibration on the line of sight stability. The base 19 is U-shaped with arms 24 and 25 respectively having the maximum cross-sections permitted in the volume which it occupies.

Referring to the elevation gimbal assembly 16, which rotates in elevation between the arms 24 and 25 of the base 19, the elevation gimbal 16 has a side wall 31, with a circular opening 27 in which a semi-floating duplex preloaded ball bearing assembly is in a bore 33 to provide a bearing axis for the elevation gimbal. As shown in FIGS. 2 and 3, the line-of-sight extends substantially coincidental with the elevation axis. The support arm 24 has opening 34 into which a captivated duplex preloaded ball bearing assembly (not shown) fits to form the bearing axis and support for the elevation gimbal 16 in a well-known manner. The bearing, of which portion 34 of the arm 24 forms a part, is omitted from FIG. 3 in order to show the interior of the azimuth gimbal 17. The mirror 18 is mounted on a mirror shaft 36 which is substantially coincident with the vertical axis in azimuth. The mirror 18 is supported by the mirror shaft 36 which in turn is carried by the azimthu gimbal 17 by ball bearings (not shown). The mirror is rotated by a belt driven system that includes a large pulley 37 concentrically mounted on the mirror shaft 36 to rotate about the azimuth axis. The pulley 37 is operated by a belt drive in a conventional manner as described in detail in U.S. Pat. No. 3,951,510 issued Apr. 20, 1976, to which reference is made for a more detailed description thereof.

Figure 6:
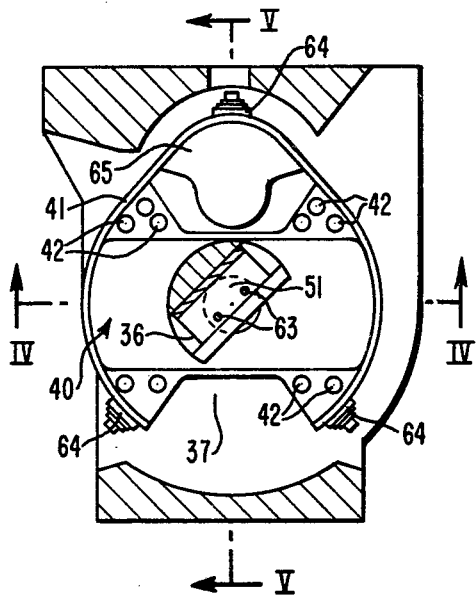
FIG. 6 is a plan view taken at lines 6—6 of FIG. 4 to show the dampening device secured to the pulley of the mirror shaft assembly.
Figure 5:
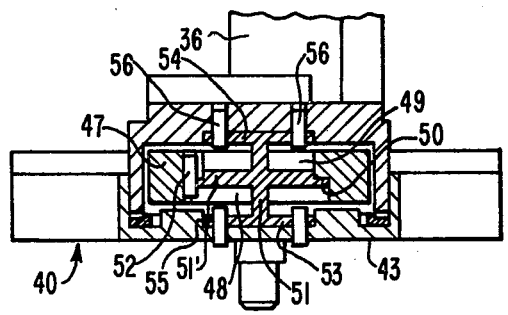
FIG. 5 is a sectional view taken at line 5—5 of FIG. 6.
Figure 4:
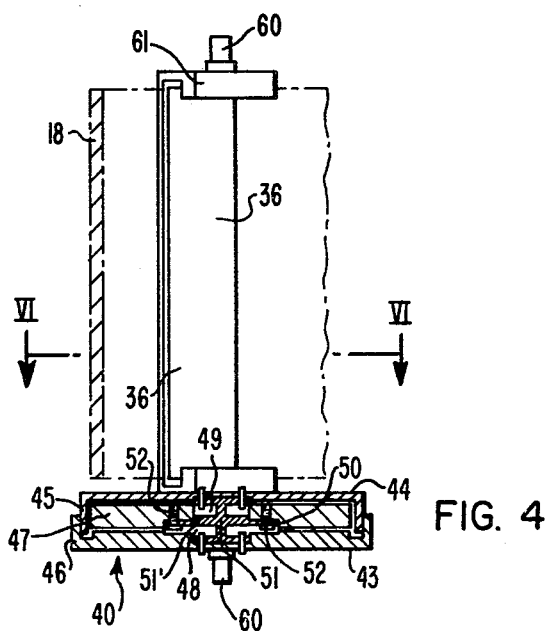
FIG. 4 is a sectional view taken on line 4—4 of FIG. 6 illustrating the dampening device and mirror shaft assembly of one embodiment of the invention with elevation gimbal omitted.

Referring to FIGS. 4, 5 and 6, the improvements of the present invention as previously discussed include a vibration dampener 40 mounted on the mirror shaft 36. This dampener reduces the peaking of the "belt resonance;" that is, the resonance defined by the inertia of the mirror assembly and compliance of a metallic drive belt 41. The vibration dampener 40 for convenience in the present description may be referred to as an inertial dampener, but in actuality, it is an approximate inertial dampener because of the inclusion of centering springs as hereinafter described.

Figure 7:
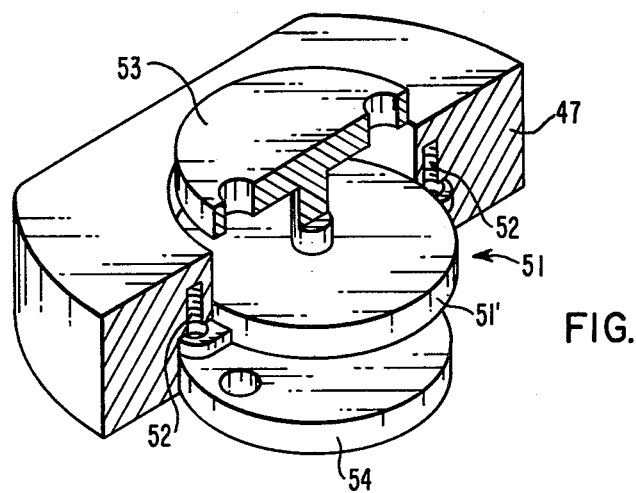
FIG. 7 is a fragmentary view in perspective to illustrate the centering spring of the dampening device.

The dampener 40 is suitably mounted by bolts 42 as shown in FIG. 6 to the pulley 37. The dampener 40 is generally rectangular in configuration and is comprised of portions 43 and 44 having peripheral flanged portions 45 and 46, respectively, that are interfitting to provide an enclosure or casing. The enclosure or casing for the device 40 has supported therein a metallic member 47 that is similarly configured to the interior cavity of the casing or housing comprised of the members 43 and 44, but of smaller area both in length, width and depth, such that it is capable of being supported in such casing without physical contact with the interior surfaces thereof. Such member 47 has a central opening 48 with a portion of reduced diameter 49, thereby forming a recessed peripheral lip 50. A torsion spring 51, an enlarged view of which is shown in FIG. 7, is inserted in the opening 48 and is so configured that its central portion 51 of increased diameter rests against the lip 50, and is secured to the floating metallic member 47 by screws such as 52 that are threaded into the member 47. Extending outwardly from the central portion of the torsion spring 51 are radially extending portions 53 and 54 that are of such configuration and area so that the portion 54 fits in a recess 55 of the member 43 of the casing. The portion 53 fits within the reduced diameter portion 49 of the opening 48. The torsion bar or spring 51 supports the metallic member 47 within the interior of the casing formed by the members 43 and 44 such that the member 47 is capable of movement therein. The spring 51 is secured in portion 54 of the recess 55 by pins or screws 56 to prevent free movement of the member 47 attached to the torsion spring 51 by screws 52. The mirror shaft 36 has a bottom flanged portion 61 to support the mirror 18 in proper position to pivot on its axis. The shaft 36 is fastened to the upper portion 53 of the torsion spring and casing by pins or screws 63. Filling the interior of the dampener surrounding the member 47 is a silicon fluid to assist in absorbing vibrations. Although silicon has been found preferable because of its relatively constant viscosity at different temperatures, other viscous fluids could be used depending on the application. Thus, the mirror 18 is supported by the shaft 36 and any movement is transferred from such shaft through the casing found by members 43 and 44 of the spring 51 to the member 47. Duplex bearings 60 on opposite ends of the shaft member 36, the centers of which are coincident with the azimuth axis, fit into suitable recesses in the azimuth gimbal 17 in a well-known manner.

In one actual embodiment, the torsion spring 51 was made of stainless steel of the grade commonly known as 17-4PH having a shaft diameter of approximately 0.06 inches. The metallic member 47 in one embodiment was made of tungsten having such a mass to provide the desired inertia as is well known in the art, for eliminating an undesired resource.

Referring to FIG. 7, the configuration of the two axis gimbal or heliostat is such that the line-of-sight travels on a one-to-one basis with the gimbaled mirror angle in elevation, and on a two-to-one basis with the gimbaled mirror angle in azimuth. To keep the optical line-of-sight aligned with the gyro stabilized azimuth axis, the half angle drive provided by the pulley 37 connected to a pulley 65 by the metallic belt 41 which is secured to such pulleys by clamps 64, is used in azimuth between the gyro stabilized gimbal 17 and the mirror 18. This half-angled drive causes the mirror 18 to turn half the angle that the azimuth gimbal 17 turns, with respect to the elevation gimbal 16.

In summary, there is provided a heliostat assembly adapted for mounting in a pod attached to an aircraft, that includes a two axis gimbal set for electro-optical systems. The heliostat has azimuth and elevation gimbals for steering the line-of-sight. A mirror is connected through an approximate inertial dampener to the belt drive system that causes the mirror to rotate half the azimuth angle turned by the azimuth gimbal. The azimuth gimbal which is an annular member is carried inside the elevation gimbal which is also an annular member which in turn is mounted in the base between support arms in two large diameter bearings, one of which has an opening through which the line-of-sight is directed from the stationary mirror of the optical assembly. The vibration dampener utilizes a centering spring in the preferred embodiment as opposed to bearings to avoid the couloumb friction. It should be pointed out that the inertial dampener 40 is not a tuned vibration absorber, but the presence of the centering springs permits the desired reduction in peaking with a smaller inertia than a true inertial dampener has. The resonance of the belt drive of the present invention is approximately 260 hertz, while the resonance of the inertial dampener is approximately 200 hertz. Thus, there is significant energy storage in the centering spring of the dampener. The azimuth axis, the mirror axis, the elevation axis and the axis of the two-to-one metallic tape drive are preferably mounted with well-known precision preloaded duplex bearings known as ABEC 7 as previously mentioned. On each of the above axes, one pair of such duplex bearings is used in a fixed configuration to provide and maintain alignment. The other pair on each of the axes is used in semifloating arrangement to accommodate differential thermal expansion and dimensional considerations. Shaft alignments, bearing fits, preloads, and lubricants should be closely controlled to minimize bearing frictional torque and hence to maximize the ratio of gimbal inertia to bearing frictional torques. The heliostat of the present invention is such that it has an angular travel of 10° in elevation above the horizon and −180° below the horizon. It has a movement in azimuth of 15° on each side of the center.

What I claim is:

1. A heliostat device for an electro-optical system, comprising a base having a pair of spaced parallel extending arms, each of said arms having adjacent their outer ends a bearing surface for pivotally supporting an elevation gimbal between said arms, one of said bearing surfaces being annular with a central opening through its associated arm;

a housing attached to said base inwardly of the outer ends of the arms;

a first reflecting surface fixedly attached to said housing in a position to reflect a line of sight extending substantially axially through the bearing opening;

an elevation gimbal having bearing surfaces spaced to fit in the bearing surfaces in the arms to pivot about a horizontal axis in elevation substantially coincident to the line of sight, one of said bearing surfaces having an opening to align with the central opening in the associated bearing surface of the arm, said elevation gimbal being annular in configuration;

an azimuth gimbal attached to the elevation gimbal to pivot about a vertical azimuth axis, said azimuth gimbal being annular in configuration;

a second reflecting surface attached to the azimuth gimbal to pivot about an axis substantially coincident to the azimuth axis, and to intersect and redirect the line of sight;

a half angle drive assembly responsive to relative turning movement between said elevation gimbal and said azimuth gimbal about said azimuth axis in the same direction as the elevation gimbal azimuth movement but to one half the angular extent; and dampening means fastened to said half-angle drive assembly to minimize the effect of vibration of the heliostat members on the line of sight.

2. A device according to claim 1 wherein the half angle drive assembly includes a pulley pivotal about the azimuth mirror axis, wherein said dampening means is fastened to said pulley.

3. A device according to claim 1 wherein the half angle drive assembly includes a pulley pivotal about the azimuth mirror axis and includes a mirror shaft pivotal about the same axis, wherein said dampening means is fastened between the pulley and the shaft.

4. A device according to claim 1 or 2 or 3 wherein the dampening means comprises a hollow casing, a torsion spring fastened in the casing, a metallic member attached to the torsion spring and being positioned and configured to be spaced from the casing, and viscous fluid filling the casing.

5. A device according to claim 1 or 2, or 3 wherein both the elevation and azimuth gimbals are annular in configuration.

* * * * *